US008914058B2

(12) United States Patent
Seo et al.

(10) Patent No.: US 8,914,058 B2
(45) Date of Patent: Dec. 16, 2014

(54) METHOD FOR CONTROLLING TRANSMIT POWER OF USER EQUIPMENT IN WIRELESS COMMUNICATION SYSTEM AND APPARATUS THEREFOR

(75) Inventors: In Kwon Seo, Anyang-si (KR); Su Hwan Lim, Anyang-si (KR); Yoon Oh Yang, Anyang-si (KR); Sang Wook Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 291 days.

(21) Appl. No.: 13/505,246

(22) PCT Filed: Oct. 4, 2010

(86) PCT No.: PCT/KR2010/006748
§ 371 (c)(1),
(2), (4) Date: Apr. 30, 2012

(87) PCT Pub. No.: WO2011/055909
PCT Pub. Date: May 12, 2011

(65) Prior Publication Data
US 2012/0231834 A1    Sep. 13, 2012

Related U.S. Application Data

(60) Provisional application No. 61/258,595, filed on Nov. 6, 2009.

(30) Foreign Application Priority Data

Dec. 1, 2009   (KR) .................... 10-2009-0117784

(51) Int. Cl.
*H04M 1/00*   (2006.01)
*H04W 52/32*   (2009.01)
*H04W 52/14*   (2009.01)
*H04W 52/36*   (2009.01)
*H04W 52/24*   (2009.01)

(52) U.S. Cl.
CPC ............ *H04W 52/32* (2013.01); *H04W 52/243* (2013.01); *Y02B 60/50* (2013.01); *H04W 52/146* (2013.01); *H04W 52/367* (2013.01)
USPC ........................................................ 455/522

(58) Field of Classification Search
CPC .... H04W 52/22; H04W 52/32; H04W 52/322
USPC ........................................................ 455/522
See application file for complete search history.

(56) References Cited

U.S. PATENT DOCUMENTS 6,856,812 B1 *   2/2005   Budka et al. .................. 455/522
8,036,151 B2 *   10/2011   Das et al. ...................... 370/311

(Continued)

FOREIGN PATENT DOCUMENTS

KR   10-2007-0068322 A   6/2007
KR   10-2007-0073339 A   7/2007

OTHER PUBLICATIONS

3GPP, LTE, 3rd Generation Partnership Project; Technical Specification Group Radio Access Network; Evolved Universal Terrestrial Radio Access (E-UTRA) Radio Resource Control (RRC); Protocol Specification (Release 9); 3GPP TS 36.331 V9.0.0, Sep. 2009, XP050377651, pp. 1-106.

(Continued)

Primary Examiner — Simon Nguyen
(74) Attorney, Agent, or Firm — Birch, Kolasch & Birch, LLP

(57) ABSTRACT

A method is disclosed for, at a base station (BS), controlling transmit power of a user equipment (UE) in a wireless communication system. This includes checking BS-specific maximum transmit power information, applying Additive-Maximum Power Reduction (A-MPR) corresponding to a legacy UE to the BS-specific maximum transmit power so as to generate BS-specific maximum transmit power information for the legacy UE, and broadcasting the BS-specific maximum transmit power information for the legacy UE.

6 Claims, 7 Drawing Sheets

(56) References Cited

U.S. PATENT DOCUMENTS

| | | | |
|---|---|---|---|
| 8,203,987 B2* | 6/2012 | Ishii et al. | 370/311 |
| 8,483,107 B2* | 7/2013 | Ahn et al. | 370/280 |
| 2004/0193971 A1 | 9/2004 | Soong et al. | |
| 2007/0047487 A1 | 3/2007 | Usuda et al. | |
| 2007/0191051 A1* | 8/2007 | Suonvieri | 455/522 |
| 2008/0146154 A1 | 6/2008 | Claussen et al. | |
| 2010/0067496 A1* | 3/2010 | Choi | 370/336 |
| 2010/0067513 A1* | 3/2010 | Murata | 370/342 |
| 2011/0256902 A1* | 10/2011 | Celebi et al. | 455/522 |
| 2011/0319119 A1* | 12/2011 | Ishii | 455/522 |
| 2013/0122947 A1* | 5/2013 | Li et al. | 455/501 |

OTHER PUBLICATIONS

ETSI, "LTE; Evolved Universal Terrestrial Radio Access (E-UTRA); User Equipment (UE) radio transmission and reception; (3GPP TS 36.101 version 8.5.1 Release 8)," ETSI TS 136 101, V8.5.1, Apr. 2009, XP-002682576 (98 pages).

NEC, "Future additional Maximum Power Reduction and SIB2", 3GPP TSG-RAN WG4 #52, R4-093210, Shenzhen, China, Aug. 24-28, 2009 (retrieved Aug. 19, 2009), XP050354275, pp. 1-4.

* cited by examiner (a) Control-plane protocol stack (b) User-plane protocol stack

Fig. 6

SIB Type 1 p-max (for Rel-8) = $P_{emax}^{*}$ − (A-MPR)

p-max` (for Rel-9) = $P_{emax}^{*}$ ⟶ New field !!

SIB Type 2 additionalSpectrumEmission = NS_xx

METHOD FOR CONTROLLING TRANSMIT POWER OF USER EQUIPMENT IN WIRELESS COMMUNICATION SYSTEM AND APPARATUS THEREFOR

CROSS REFERENCE TO RELATED APPLICATIONS

This application is the National Phase of PCT/KR2010/006748 filed on Oct. 4, 2010, which claims priority under 35 U.S.C. 119(e) to U.S. Provisional Application No. 61/258,595 filed on Nov. 6, 2009 and under 35 U.S.C. 119(a) to Patent Application No. 10-2009-0117784 filed in the Republic of Korea on Dec. 1, 2009, all of which are hereby expressly incorporated by reference into the present application.

TECHNICAL FIELD

The present invention relates to a wireless communication system, and more particularly, to a method for, at a base station, controlling transmit power of a user equipment in a wireless communication system and an apparatus therefor.

BACKGROUND ART

As an example of a mobile communication system, to which the present invention is applicable, a 3rd Generation Partnership Project Long Term Evolution (3GPP LTE) communication system will be schematically described.

FIG. 1 is a schematic diagram showing a network architecture of an Evolved Universal Mobile Telecommunications System (E-UMTS) as an example of a mobile communication system. The E-UMTS is an evolved version of the existing Universal Mobile Telecommunications System (UMTS) and basic standardization thereof is in progress under the 3GPP. In general, the E-UMTS is also referred to as a Long Term Evolution (LTE) system. For details of the technical specifications of the UMTS and the E-UMTS, refer to Release 7 and Release 8 of "3rd Generation Partnership Project; Technical Specification Group Radio Access Network", respectively.

Referring to FIG. 1, the E-UMTS mainly includes a User Equipment (UE) 120, base stations (BSs) (or eNBs or eNode Bs) 110a and 110b, and an Access Gateway (AG) which is located at an end of a network (E-UTRAN) and which is connected to an external network. Generally, the BS can simultaneously transmit multiple data streams for a broadcast service, a multicast service and/or a unicast service.

One or more cells may exist for one BS. The cell provides a downlink or uplink transmission service to several UEs using any one of bandwidths of 1.4, 3, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

Recently, standardization of the successor to LTE is in progress under the 3GPP. In the present specification, the above technology is referred to as "LTE-Advanced" or "LTE-A". The LTE system and the LTE-A system are different from each other in a system bandwidth difference. The LTE-A system is to support a maximum wideband of 100 MHz. The LTE-A system uses carrier aggregation or bandwidth aggregation technology to achieve a wideband using a plurality of component carriers. In the carrier aggregation, in order to use a wider frequency band, the plurality of component carriers is treated as one large logic frequency band. The bandwidth of each component carrier may be defined based on the bandwidth of a system block used in the LTE system. In the present specification, the component carrier may be a component carrier for carrier aggregation or a central carrier of the component carrier according to context.

DISCLOSURE OF INVENTION

Technical Problem

An object of the present invention devised to solve the problem lies on a method for, at a Base Station (BS), controlling transmit power of a User Equipment (UE) in a wireless communication system, and a BS apparatus therefor.

Solution to Problem

The object of the present invention can be achieved by providing a method for, at a base station (BS), controlling transmit power of a user equipment (UE) in a wireless communication system, the method including: checking BS-specific maximum transmit power information; applying Additive-Maximum Power Reduction (A-MPR) corresponding to a legacy UE to the BS-specific maximum transmit power so as to generate BS-specific maximum transmit power information for the legacy UE; and broadcasting the BS-specific maximum transmit power information for the legacy UE.

The BS-specific maximum transmit power information for the legacy UE may be a value obtained by subtracting the A-MPS corresponding to the legacy UE from the BS-specific maximum transmit power information. The broadcasting may include broadcasting the BS-specific maximum transmit power information for the legacy UE and the BS-specific maximum transmit power information through System Information Block (SIB) Type 1.

In another aspect of the present invention, provided herein is a Base Station (BS) apparatus including: a process configured to check BS-specific maximum transmit power information and to apply Additive-Maximum Power Reduction (A-MPR) corresponding to a legacy User Equipment (UE) to the BS-specific maximum transmit power so as to generate BS-specific maximum transmit power information for the legacy UE; and a transmission module configured to broadcast the BS-specific maximum transmit power information for the legacy UE.

The processor may generate the BS-specific maximum transmit power information for the legacy UE by subtracting the A-MPS corresponding to the legacy UE from the BS-specific maximum transmit power information, the transmission module may broadcast the BS-specific maximum transmit power information for the legacy UE and the BS-specific maximum transmit power information through System Information Block (SIB) Type 1.

Advantageous Effects of Invention

According to the embodiments of the present invention, it is possible to efficiently solve backward compatibility problems associated with development of mobile communication systems, in the setting of maximum transmit power of a user equipment.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 6 is a diagram showing signaling information of a base station according to an embodiment of the present invention.

MODE FOR THE INVENTION

Reference will now be made in detail to the preferred embodiments of the present invention, examples of which are illustrated in the accompanying drawings. The following embodiments are examples in which the technical features of the present invention are applied to a 3GPP system.

In the present specification, a 3GPP LTE (Release-8) system is referred to as an LTE system or a legacy system. In addition, a User Equipment (UE) supporting the LTE system is referred to as an LTE UE or a legacy UE. A 3GPP LTE (Release-9) system is referred to as an evolved system. In addition, a UE supporting the LTE (Release-9) system is referred to an evolved UE.

Although the embodiments of the present invention are described using Release 8 and Release 9, the embodiments of the present invention are applicable to any communication system corresponding to the above definition.

Figure 1:
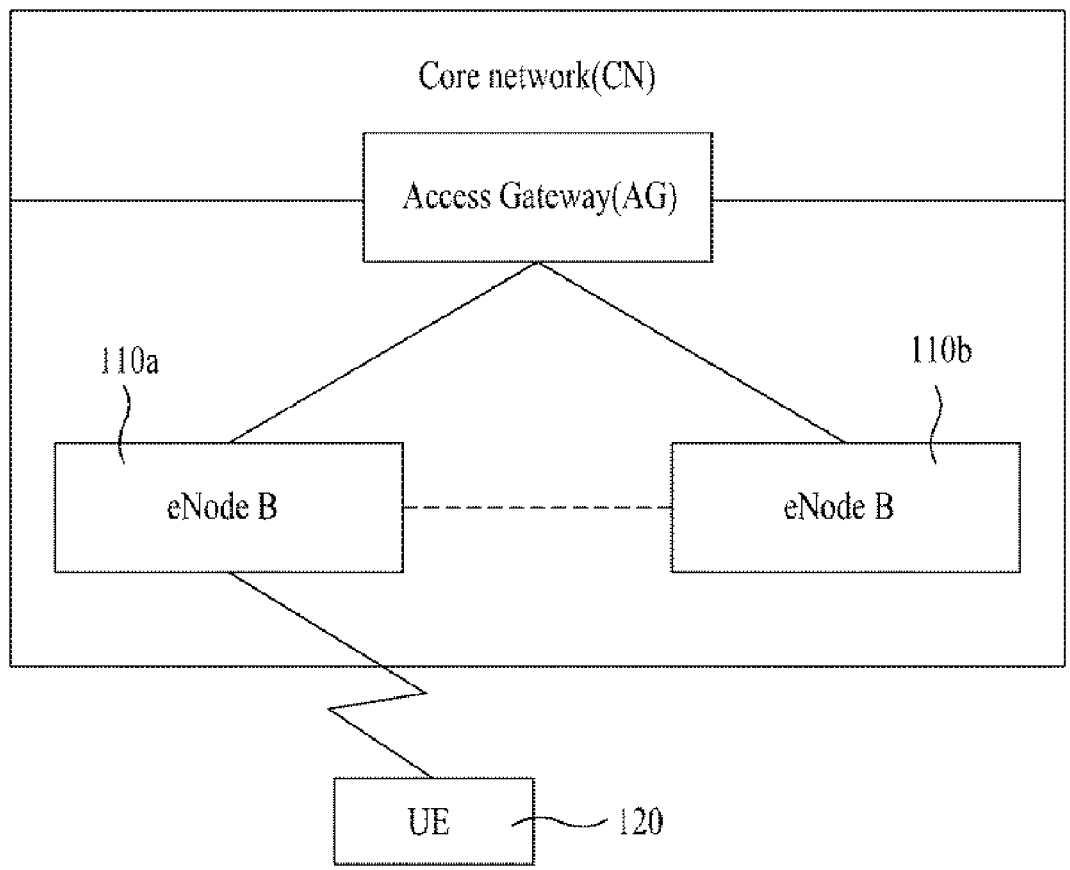
FIG. 1 is a schematic diagram showing a network architecture of an Evolved Universal Mobile Telecommunications System (E-UMTS) as an example of a mobile communication system.
Figure 2:
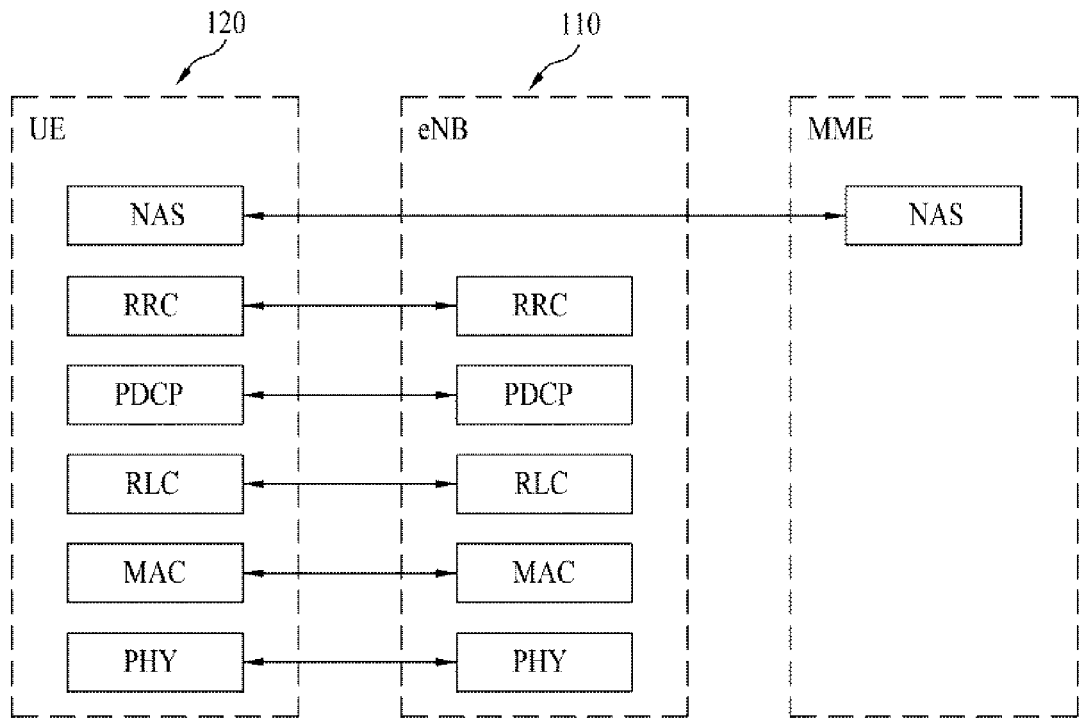
FIG. 2 is a diagram showing the structure of a control plane and a user plane of a radio interface protocol between a User Equipment (UE) and an E-UTRAN based on the 3GPP radio access network standard.
Figure 2:
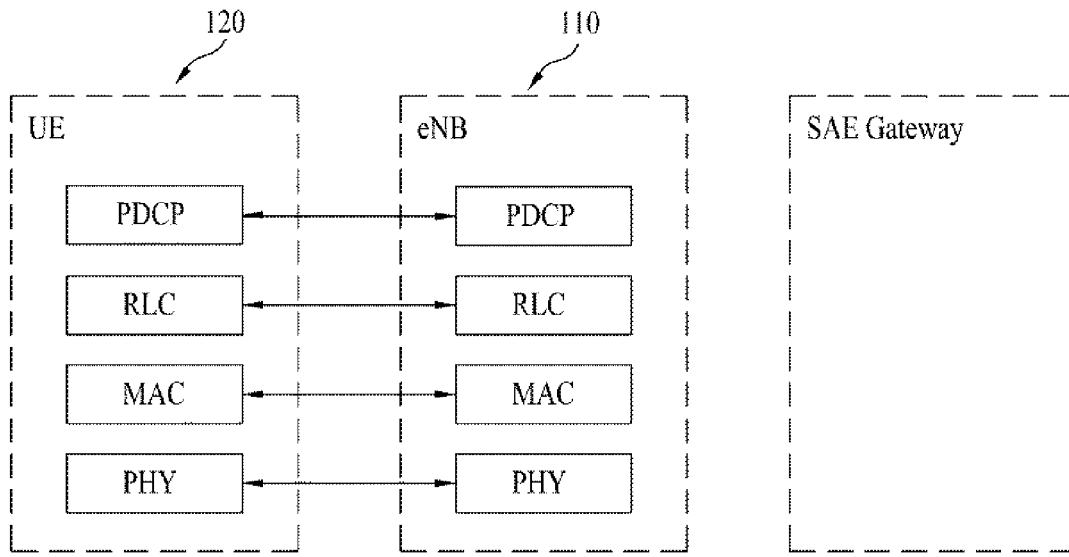

FIG. 2 is a diagram showing the structure of a control plane and a user plane of a radio interface protocol between a UE and an E-UTRAN based on the 3GPP radio access network standard. The control plane refers to a path through which control messages used for managing a call by the UE and the E-UTRAN are transmitted. The user plane refers to a path through which data generated at an application layer, for example, voice data, Internet packet data or the like is transmitted.

The physical layer, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel. The physical channel uses time and frequency as radio resources. In detail, the physical channel is modulated using an Orthogonal Frequency Division Multiple Access (OFDMA) scheme in downlink and is modulated using a Single Carrier Frequency Division Multiple Access (SC-FDMA) scheme in uplink.

The MAC layer of the second layer provides services to a radio link control (RLC) layer, which is a higher layer, via a logical channel. The RLC layer of the second layer enables reliable data transmission. The function of the RLC layer is included as the functional block of the MAC layer. A Packet Data Convergence Protocol (PDCP) layer of the second layer performs a header compression function that reduces the size of an Internet protocol (IP) packet header containing unnecessary control information having a relatively large size in order to efficiently transmit the IP packets such as IPv4 or IPv6 packets over a radio interface having a limited bandwidth.

A Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.4, 3, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
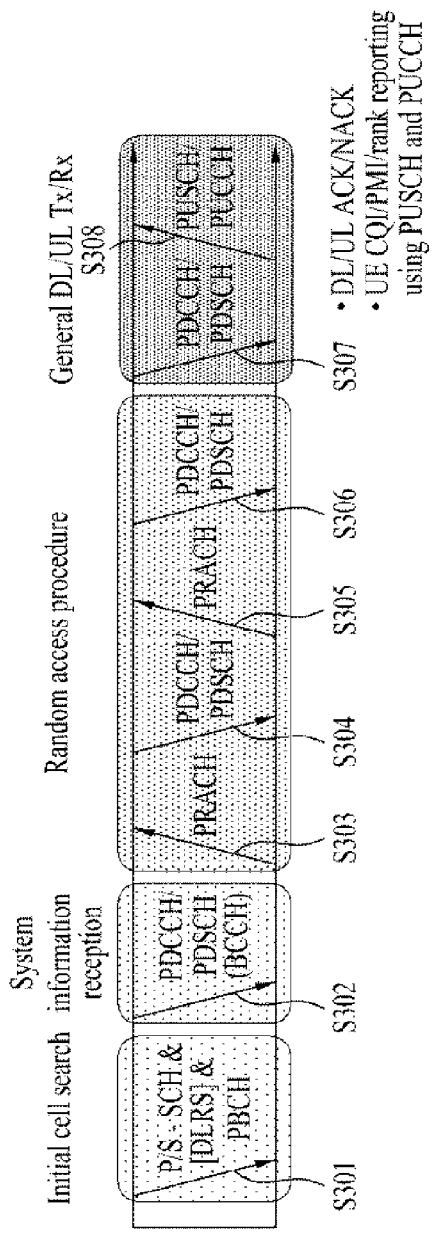
FIG. 3 is a diagram illustrating physical channels used in a 3GPP system and a general signal transmitting method using the same.

FIG. 3 is a diagram illustrating physical channels used in a 3GPP system and a general signal transmitting method using the same.

If a UE is powered on or newly enters a cell, the UE performs an initial cell search operation such as synchronization with a base station (S301). The UE receives a primary synchronization channel (P-SCH) and a secondary synchronization channel (S-SCH) from the base station so as to synchronize with the base station and to acquire information such as a cell ID. Thereafter, the UE may receive a physical broadcast channel from the base station so as to acquire a broadcast signal in the cell. The UE may receive a downlink reference signal (DL RS) so as to check a downlink channel state in the initial cell search step.

The UE, upon completion of initial cell search, may receive a Physical Downlink Control Channel (PDCCH) and a Physical Downlink Shared Channel (PDSCH) according to information carried in the PDCCH so as to acquire more detailed system information (S302).

When the UE initially accesses the base station or when radio resources for signal transmission are not present, the UE may perform a Random Access Procedure (RACH) with respect to the base station (steps S303 to S306). The UE may transmit a specific sequence using a preamble through a Physical Random Access Channel (PRACH) (S303 and S305) and receive a response message of the preamble through the PDCCH and the PDSCH corresponding thereto (S304 and S306). In the contention-based RACH, a contention resolution procedure may be additionally performed.

The UE which performs the above-described procedure may receive the PDCCH/PDSCH (S307) and transmit a Physical Uplink Shared Channel (PUSCH)/Physical Uplink Control Channel (PUCCH) (S308), as a general uplink/downlink signal transmission procedure. The information transmitted from the UE to the base station in uplink and transmitted from the base station to the UE may include a downlink/uplink ACK/NACK signal, a Channel Quality Indicator (CQI), a Precoding Matrix Index (PMI), a Rank Indicator (RI), etc. In the 3GPP LTE system, the UE may transmit the above-described information such as CQI/PMI/RI through the PUSCH and/or the PUCCH.

First, a method for, at the base station, controlling transmit power of the UE will be described.

In the LTE system, maximum power $P_{cmax}$ actually available to the UE is expressed as follows.

$$P_{cmax} = \text{Min}(P_{emax}, P_{umax}) \qquad \text{<Equation 1>}$$

where, $P_{cmax}$ denotes maximum power (actual maximum transmit power) transmittable by the UE in a cell, $P_{emax}$ denotes maximum power available in the cell of the base station. In addition, $P_{umax}$ denotes power obtained by applying Maximum Power Reduction (MPR) and Additive-MPR (A-MPR) to maximum power $P_{PowerClass}$ of the UE. In the current LTE system, the maximum power $P_{PowerClass}$ of the UE is defined as Power Class 3 and is 23 dBm.

The MPR refers to power reduction of maximum transmit power defined with respect to a specific modulation order or the number of Resource Blocks (RBs) in order to satisfy RF requirements (Spectrum Emission Mask (SEM), Adjacent Channel Leakage Ratio (ACLR), etc.) defined in the standard, and the A-MPR refers to power reduction for maximum transmit power defined according to regional characteristics. Hereinafter, the A-MPR will be described in detail.

Figure 4:
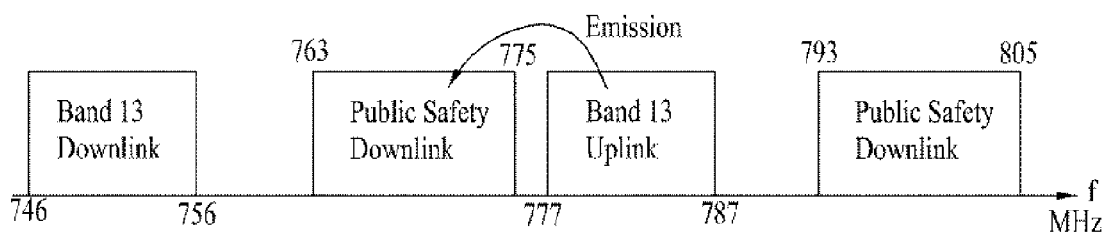
FIG. 4 is a diagram showing an example of using a frequency if Band13 defined in an LTE system is used in the United States of America.

FIG. 4 is a diagram showing an example of using a frequency if Band13 defined in an LTE system is used in the United States of America. Here, Band13 refers to a frequency band having a downlink bandwidth of 746 to 756 MHz and an uplink bandwidth of 777 to 787 MHz.

Referring to FIG. 4, as national or regional frequency policies are independently established, a frequency band adjacent to a frequency band used by a UE must be nationally or regionally protected. As can be seen from FIG. 4, in the United States, a public safety frequency band, that is, the Public Safety (PS) band, is specified adjacent to Band13, and interference in a PS band generated by another system is restricted to a predetermined value or less.

However, if the frequency band of the LTE system is configured as shown in FIG. 4 and each UE transmits a signal with general power, requirements for emission decided in the national regulations cannot be satisfied. Accordingly, the maximum power of the UE is further decreased using appropriate A-MPR such that the transmit power of the UE is adjusted to a level satisfying national regulations.

In the current LTE standard of the 3GPP, if the base station signals a Network Signaling (NS) value according to national or regional characteristics, an A-MPR value corresponding to the NS is defined. In the current protocol standard of the LTE system, an Information Element (IE) "AdditionalSpectrumEmission" is defined, and 32 NSs may be included in the IE. The A-MPR value corresponding to each NS is defined by 3GPP standard document TS36.101 and is currently defined in Release 8 as shown in Table 1.

TABLE 1

| Network Signalling value | Requirements (sub-clause) | E-UTRA Band | Channel bandwidth (MHz) | Resources Blocks | A-MPR (dB) |
|---|---|---|---|---|---|
| NS_01 | NA | NA | NA | NA | NA |
| NS_03 | 6.6.2.2.1 | 2, 4, 10, 35, 36 | 3 | >5 | =1 |
|  | 6.6.2.2.1 | 2, 4, 10, 35, 36 | 5 | >6 | =1 |
|  | 6.6.2.2.1 | 2, 4, 10, 35, 36 | 10 | >6 | =1 |
|  | 6.6.2.2.1 | 2, 4, 10, 35, 36 | 15 | >8 | =1 |
|  | 6.6.2.2.1 | 2, 4, 10, 35, 36 | 20 | >10 | =1 |
| NS_04 | 6.6.2.2.2 | TBD | TBD | TBD |  |
| NS_05 | 6.6.3.3.1 | 1 | 10, 15, 20 | =50 for QPSK | =1 |
| NS_06 | 6.6.2.2.3 | 12, 13, 14, 17 | 1.4, 3, 5, 10 | n/a | n/a |
| NS_07 | 6.6.2.2.3 6.6.3.3.2 | 13 | 10 | Table 6.2.4-2 | Table 6.2.4-2 |
| ... |  |  |  |  |  |
| NS_32 | — | — | — | — | — |

In Release 8, a Master Information Block (MIB) and a System information Block (SIB) including information about the cell are broadcast in the cell through the physical channel such as PBCH or PDSCH. SIB is divided into various types and the power of the UE and the NS associated information are transmitted through SIB Type 1 and SIB Type 2.

band adjacent to the frequency band in a procedure of correcting the existing band or making a new frequency band due to changes in national frequency policies.

Recently, as the frequency policy of Japan is changed, in Release 9, Band18 and 19 are newly defined and NS_08 which is the NS of Band19 is defined as shown in Table 2.

TABLE 2

| Network Signalling value | Requirements (sub-clause) | E-UTRA Band | Channel bandwidth (MHz) | Resources Blocks | A-MPR (dB) |
|---|---|---|---|---|---|
| NS_01 | NA | NA | NA | NA | NA |
| NS_03 | 6.6.2.2.1 | 2, 4, 10, 35, 36 | 3 | >5 | =1 |
|  | 6.6.2.2.1 | 2, 4, 10, 35, 36 | 5 | >6 | =1 |
|  | 6.6.2.2.1 | 2, 4, 10, 35, 36 | 10 | >6 | =1 |
|  | 6.6.2.2.1 | 2, 4, 10, 35, 36 | 15 | >8 | =1 |
|  | 6.6.2.2.1 | 2, 4, 10, 35, 36 | 20 | >10 | =1 |
| NS_04 | 6.6.2.2.2 | TBD | TBD | TBD |  |
| NS_05 | 6.6.3.3.1 | 1 | 10, 15, 20 | =50 for QPSK | =1 |
| NS_06 | 6.6.2.2.3 | 12, 13, 14, 17 | 1.4, 3, 5, 10 | n/a | n/a |
| NS_07 | 6.6.2.2.3 6.6.3.3.2 | 13 | 10 | Table 6.2.4-2 | Table 6.2.4-2 |
| NS_08 | 6.6.3.3.3 | 19 | 10, 15 | >29 | =1 |
|  |  |  |  | >39 | =2 |
|  |  |  |  | >44 | =3 |
| ... |  |  |  |  |  |
| NS_32 | — | — | — | — | — |

In SIB Type 1, the maximum power $P_{emax}$ of the UE available in the cell is signaled through a p-max field and, in SIB Type 2, an NS value suitable for the cell is signaled through an additionalSpectrumEmission field such that the UEs present in the cell recognize the A-MPR.

As can be seen from Table 1, in Release 8, the A-MPR values for seven NSs are defined (including TBD and NA) and NS_08 to NS-32 are not defined. If a specific NS is signaled and the UE is aware of the NS, the A-MPR is applicable to Equation 1 as defined in Table 1. However, if the UE is unaware of the NS, the operation is not defined in the current standard document. Accordingly, a problem may occur when a Release-8 UE attempts to access a cell of a Release-9 base station supporting an NS, of which the Release-8 UE is unaware.

Figure 5:
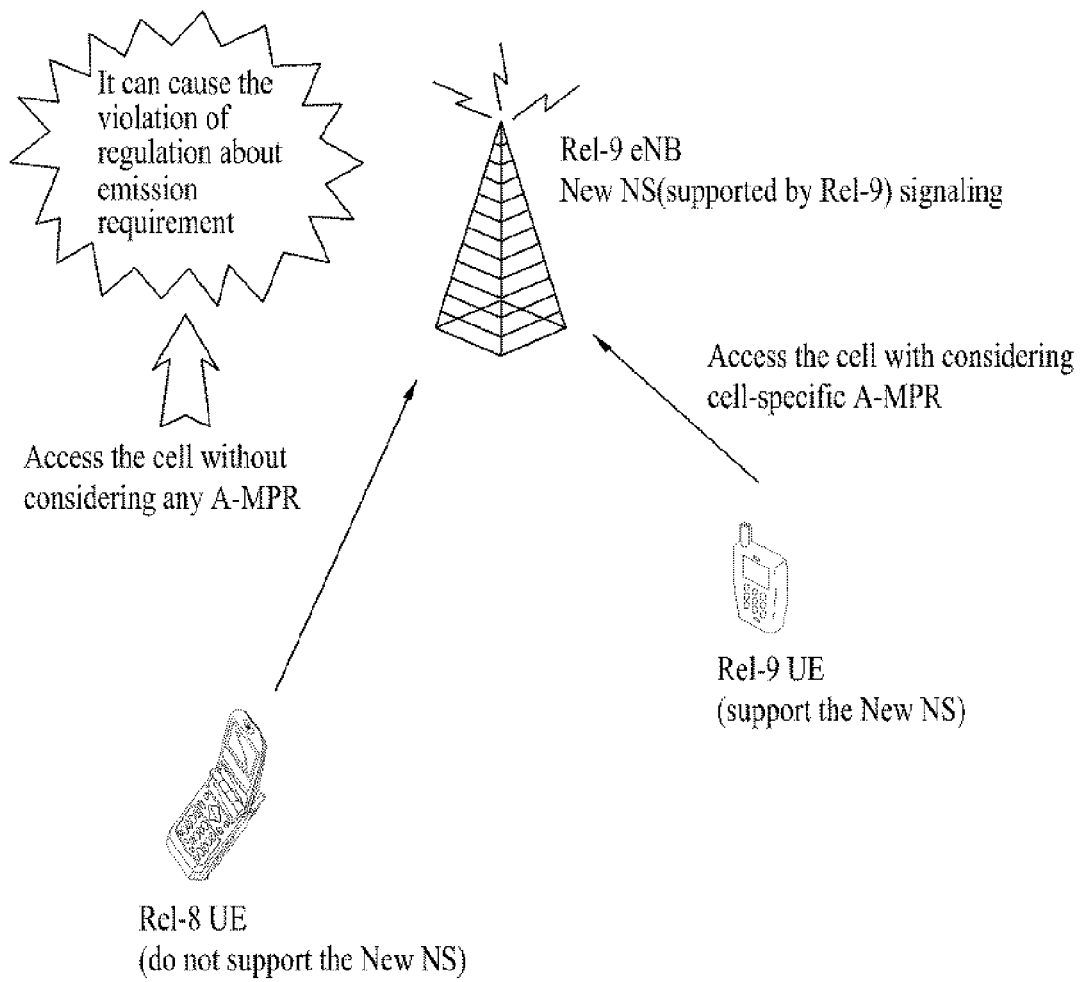
FIG. 5 is a diagram showing a problem which may occur when transmit power of a UE is controlled by the related art.

FIG. 5 is a diagram showing a problem which may occur when transmit power of a UE is controlled according to the related art. In particular, FIG. 5 shows the case where a base station (eNB) broadcasts a new NS which is not present in Release 8 in a cell.

Referring to FIG. 5, the Release-9 UE is aware of the new NS and thus satisfies the emission requirements of the frequency band currently used for communication. However, if the Release-8 UE enters the cell and attempts to access the base station, the UE is unaware of the A-MPR value defined in the new NS. Accordingly, there is no method for restricting the power of the Release-8 UE and there is a problem that an emission signal violating the requirements of the frequency band which must be protected by the new NS is increased.

In addition, as Release 8 has been finalized and standardization of Release 9 is in progress, a new A-MPR value which is not defined in Release 8 is being discussed and thus a compatibility problem with Release 8 may occur. The reason why the new NS and the A-MPR value suitable therefor are discussed is because the new A-MPR is necessary due to the presence of a system, which must be protected, in a frequency In such a procedure, as requirements which are not present in Release 8 have been added, backward compatibility with the existing Release-8 UE may not be guaranteed and, in a worst case scenario, the Release-8 UE may not be able to perform communication in the cell of the Release-9 base station. In addition, since the NS value for applying the A-MPR and the frequency band of Release 9 will be continuously increased, the operation of the current Release-8 UE when attempting to access the cell of the Release-9 base station needs to be clearly defined. Accordingly, the object of the present invention is to maintain a minimum communication environment even when the existing Release-8 UE is unaware of a new NS value.

As a method for solving such problems, a method of disabling a UE, which is unaware of an NS, to attempt access to a base station if the NS, of which the UE is unaware, is signaled may be considered. However, this method is not preferable in that backward compatibility is not guaranteed, because the Release-8 UE cannot operate in the cell supporting Release 9.

A method of allocating a frequency close to a frequency band which must be protected to the Release-9 UE and allocating the other frequency to the Release-8 UE may be considered. In this method, no problem occurs even when the A-MPR is not applied to the transmit power of the Release-8 UE. However, this method is not preferable, due to a problem that the available frequency of the existing UE is increasingly restricted with the development of a wireless communication system and a problem which may occur in terms of frequency scheduling in a frequency band having a relatively small bandwidth.

As another method, there is a method of specifically signaling power control information specifically broadcast in the current cell to a UE. This method is advantageous in that only control information for a newly added UE is considered regardless of the development of the wireless communication system. However, such a method has a problem that the conventional power control method is corrected on the whole.

Hereinafter, a method for, at the Release-9 base station, effectively controlling the maximum transmit power of the Release-8 UE without generating the above problems will be described. The present invention is devised because the Release-9 base station is aware of both the NS of the conventional system and the A-MPR associated with the NS. The present invention proposes a method for newly adding a field (e.g., p-max') for $P_{emax}$ for the Release-9 UE to SIB Type 1 broadcast by the base station in the cell and broadcasting power, to which the A-MPR defined by the NS transmitted by the base station is applied, is broadcast in the cell through the existing p-max field. That is, the Release-8 UE sets the actually transmittable maximum power $P_{cmax}$ through $P_{emax}$ to which the signaled A-MPR is applied, and the Release-9 UE sets $P_{cmax}$ using the existing method but operates using a method of receiving $P_{emax}$ from the newly specified field (p-max').

FIG. 6 is a diagram showing signaling information of a base station according to an embodiment of the present invention. In particular, in FIG. 6, $P_{emax}*$ refers to maximum power available in the cell previously set by the base station.

Referring to FIG. 6, the Release-9 base station sets the p-max field for the Release-8 UE to a value obtained by applying A-MPR to $P_{emax}*$, that is, a value $(P_{emax}*)-(A-MPR)$ so as to broadcast the p-max field. In addition, the p-max' field for the Release-9 UE is set to the value $P_{emax}*$ so as to be broadcast. In SIB Type 2, an NS suitable for the cell is broadcast.

In this case, since the Release-8 UE is unaware of the presence of the new power field, that is, the p-max' field, the Release-8 UE reads only the existing p-max field so as to recognize the power signaled by the base station, to which the A-MPR is applied, as Pemax. In addition, since only information about the added NS which is not present in the existing system is included in SIB Type 2, the Release-8 UE ignores the NS information included in SIB Type 2 and sets the maximum power using only Pemax broadcast by the base station. In particular, the Release-8 UE may set the A-MPR value to 0 so as to set the maximum transmit power, if the NS information included in SIB Type 2 cannot be read.

In addition, the Release-9 UE reads the p-max' field of SIB Type 1 so as to recognize $P_{emax}*$ and reads the NS broadcast in SIB Type 2 so as to recognize the A-MPR value to be applied. Accordingly, the Release-9 UE calculates the maximum transmit power of the UE based on Equation 1 similar to the related art.

Figure 7:
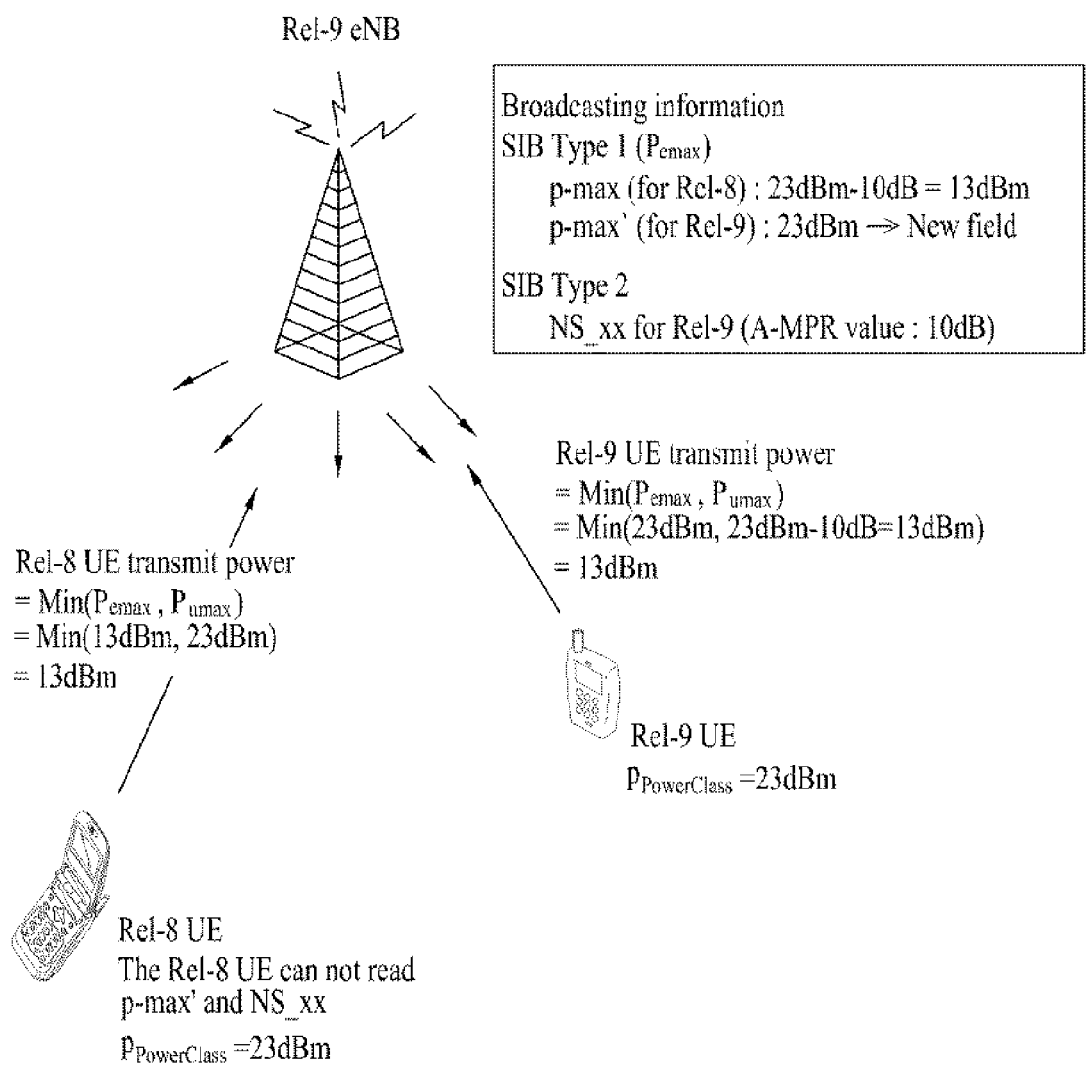
FIG. 7 is a diagram showing an example of setting transmit power of a UE according to an embodiment of the present invention.

FIG. 7 is a diagram showing an example of setting transmit power of a UE according to an embodiment of the present invention. In particular, it is assumed that the A-MPR set by the Release-9 base station is 10 dB, $P_{emax}*$ which is the maximum power available in the cell signaled by the base station is 23 dBm, and the maximum power PPowerClass of the UE is defined as Class 3 and is 23 dBm as described above. In addition, for convenience of description, the MPR of Equation 1 is not considered.

Referring to FIG. 7, the base station broadcasts the p-max field for the Release-8 UE set to a value obtained by applying A-MPR to $P_{emax}*$, that is, a value (23 dBm)–(10 dB)=13 dBm, and the p-max' field for the Release-9 UE set to 23 dBm. In SIB Type 2, NSs added in Release 9 or later are broadcast.

At this time, the Release-9 UE reads only the existing p-max field of SIB Type 1 so as to recognize the base station signaling power of 13 dBm as Pemax and ignores the NS information included in SIB Type 2. Accordingly, the Release-8 UE sets the maximum transmit power of the UE to 13 dBm which is a minimum value of $P_{emax}$ of 13 dBm and $P_{umax}$ of 23 dBm according to Equation 1.

In addition, the Release-9 UE reads only the new p-max' field of SIB Type 1 so as to recognize the base station signaling power as $P_{emax}$, similar to the conventional operation. In addition, the Release-9 UE recognizes that A-MPR is 10 dB through the NS information included in SIB Type 2. Accordingly, the Release-9 UE sets the maximum transmit power of the UE to 13 dBm.

As can be seen from FIG. 7, according to the present invention, even when the Release-8 UE is unaware of the new NS and the A-MPR value according to the new NS, the release-8 UE can set the maximum power to be equal to or less than that of the Release-9 UE. Accordingly, it is possible to establish an environment in which the Release-8 UE and the Release-9 UE can perform communication without any problems using the Release-9 base station to which the new NS is applied.

The present invention is not limited to Release 8 and Release 9 which are the 3GPP LTE standards and is similarly applicable to subsequent Releases (including the LTE-A system) and a roaming service for regions in which different NSs are signaled due to regional differences.

Figure 8:
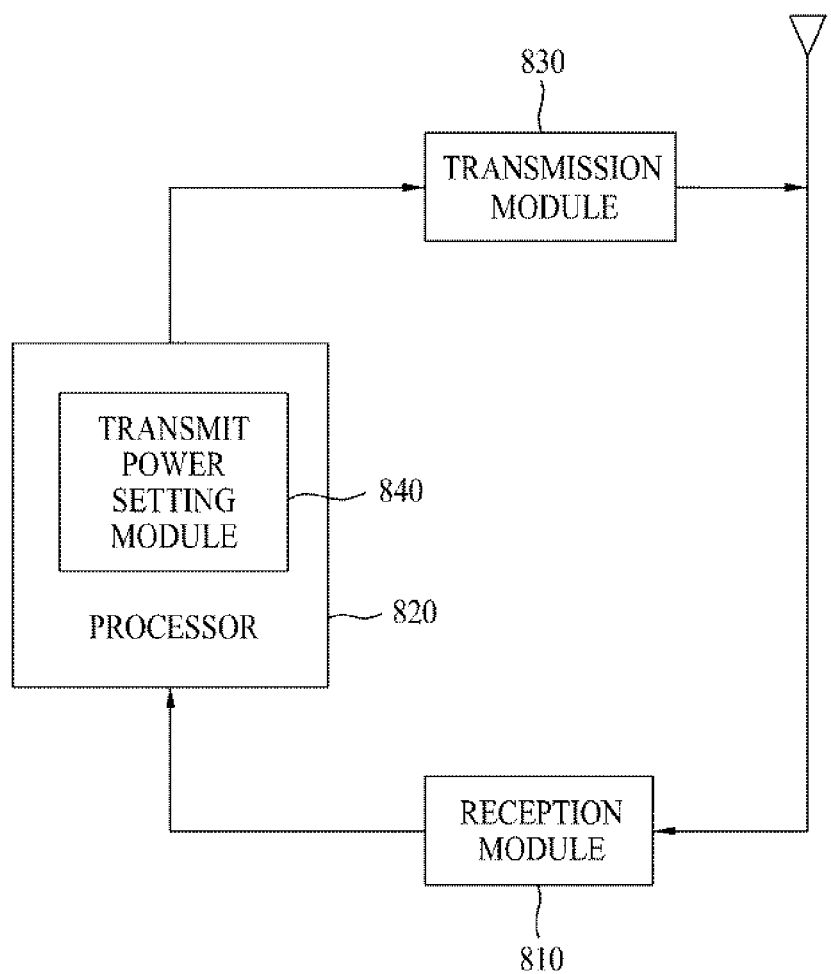
FIG. 8 is a block diagram of a base station apparatus which is applicable to an embodiment of the present invention.

FIG. 8 is a block diagram of a base station apparatus which is applicable to an embodiment of the present invention.

Referring to FIG. 8, the base station apparatus of the present invention includes a reception module 810, a processor 820 and a transmission module 830. In particular, the processor 820 may further include a transmit power setting module 840.

The reception module 810 may receive general data and control information transmitted from a UE or another base station.

The processor 820 controls the overall operation of the base station apparatus and may broadcast system information for controlling the transmit power of the UE present in the cell of the base station. In addition, the transmit power setting module 840 included in the processor 820 sets a value obtained by applying A-MPR to $P_{emax}*$ in the p-max field for the Release-8 UE included in SIB Type 1. In addition, the transmit power setting module 840 sets $P_{emax}*$ in the p-max' field for the Release-9 UE included in SIB Type 1. In SIB Type 2, an added NS which is not present in the existing system, that is, an NS added in Release 9 or more, is set.

The transmission module 830 may transmit general data and control information to a UE or another base station and, more particularly, may transmit various SIBS for the transmit power of the UE according to the present invention.

The above-described embodiments are proposed by combining constituent components and characteristics of the present invention according to a predetermined format. The individual constituent components or characteristics should be considered optional on the condition that there is no additional remark. If required, the individual constituent components or characteristics need not be combined with other components or characteristics. Also, some constituent components and/or characteristics may be combined to implement the embodiments of the present invention. The order of operations disclosed in the embodiments of the present invention may be changed. Some components or characteristics of any one embodiment may also be included in other embodiments, or may be replaced with those of the other embodiments as necessary. In addition, embodiments may be configured by combining claims which do not have an explicit relationship or new claims may be added by amendment after application.

The above-mentioned embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary. In other words, it will be obvious to those skilled in the art that various operations for enabling the base station to communicate with the mobile station in a network composed of several network nodes including the base station will be conducted by the base station or other network nodes other than the base station. The term "Base Station" may be used interchangeably with the terms fixed station, Node-B, eNode-B (eNB), or access point as necessary. The term "mobile station" may also used interchangeably with the terms user equipment (UE), mobile station (MS) or mobile subscriber station (MSS) as necessary.

The following embodiments of the present invention can be implemented by a variety of means, for example, hardware, firmware, software, or a combination thereof. In the case of implementing the present invention by hardware, the present invention can be implemented using application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. The software code may be stored in a memory unit so as to be driven by a processor. The memory unit is located inside or outside of the processor so as to communicate with the aforementioned processor via a variety of well-known parts.

INDUSTRIAL APPLICABILITY

The present invention is applicable to a wireless communication system. In more detail, the present invention is applicable to a method for, at a base station, controlling maximum transmit power of a UE in a wireless communication system and an apparatus therefor.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for, at a base station (BS), supporting an evolved system, and transmitting power control information in a wireless communication system, the method comprising:
   checking a first maximum transmit power information;
   generating a second maximum transmit power information by subtracting an additive-Maximum Power Reduction (A-MPR) corresponding to a legacy system from the first maximum transmit power information; and
   broadcasting power control information including the first maximum transmit power information and the second maximum transmit power information.

2. The method according to claim 1, wherein the power control information is transmitted through a System Information Block (SIB) Type 1.

3. The method according to claim 2, further comprising broadcasting the A-MPR corresponding to the evolved system through an SIB Type 2.

4. A Base Station (BS) apparatus supporting an evolved system, the BS comprising:
   a processor configured to:
     check a first maximum transmit power information, and
     generate a second maximum transmit power information by subtracting an additive-Maximum Power Reduction (A-MPR) corresponding to a legacy system from the first maximum transmit power information; and
   a transmission module configured to broadcast a power control information including the first maximum transmit power information and the second maximum transmit power information.

5. The BS apparatus according to claim 4, wherein the power control information is transmitted through a System Information Block (SIB) Type 1.

6. The BS apparatus according to claim 5, wherein the transmission module is further configured to broadcast the A-MPR corresponding to the evolved system through an SIB Type 2.

* * * * *